US011928145B1

United States Patent
Shi et al.

(10) Patent No.: US 11,928,145 B1
(45) Date of Patent: Mar. 12, 2024

(54) CREATING A KNOWLEDGE GRAPH FOR A VIDEO

(71) Applicant: International Business Machines Corporation, Armonk, NY (US)

(72) Inventors: Yanfeng Shi, Beijing (CN); Hui Gao, Beijing (CN); Yue Chen, Beijing (CN); Yuan Yuan Ding, Shanghai (CN); Hai Jun Xu, Beijing (CN); Huai Nan Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/063,717

(22) Filed: Dec. 9, 2022

(51) Int. Cl.
G06F 3/0481 (2022.01)
G06F 3/04842 (2022.01)
(Continued)

(52) U.S. Cl.
CPC ............ G06F 16/41 (2019.01); G06F 3/0481 (2013.01); G06F 3/04842 (2013.01);
(Continued)

(58) Field of Classification Search
CPC ...... G06F 16/435; G06F 16/489; G06F 16/45; G06F 3/0481; G06F 3/04842;
(Continued)

(56) References Cited

U.S. PATENT DOCUMENTS

| | | |
|---|---|---|
| 8,818,038 B2 | 8/2014 | Peleg et al. |
| 10,423,652 B2 | 9/2019 | Zhai et al. |

(Continued)

FOREIGN PATENT DOCUMENTS

| | | |
|---|---|---|
| CN | 101382937 A | 3/2009 |
| CN | 113722540 A | 11/2021 |
| EP | 3518145 A1 | 7/2019 |

OTHER PUBLICATIONS

Nikhitha Mani et al., A Knowledge Graph Approach towards Re-structuring of Scientific Articles, Aug. 31, 2022, International Conference on Connected Systems & Intelligence, pp. 1-8 (Year: 2022).*

(Continued)

*Primary Examiner* — Tam T Tran
(74) *Attorney, Agent, or Firm* — CANTOR COLBURN LLP; Jordan Schiller

(57) ABSTRACT

Methods for creating a knowledge graph for a video are disclosed. Aspects include obtaining the video, processing the video to extract audio information and video information, and storing the extracted audio information and video information with a timestamp corresponding its occurrence in the video. Aspects also include creating a plurality of groups of the extracted audio information and video information based at least in part on the timestamps and extracting two or more keywords from each of the plurality of groups. Aspects further include identifying a relationship between the two or more keywords based on the extracted audio information and video information and creating a graph having a plurality of nodes and a plurality of links that connect a pair of nodes of the plurality of nodes. Each node corresponds to an extracted keyword and each link corresponds to the identified relationship between the pair of nodes.

20 Claims, 7 Drawing Sheets

(51) Int. Cl.
*G06F 16/41*   (2019.01)
*G06F 16/435*  (2019.01)
*G06F 16/45*   (2019.01)
*G06F 16/48*   (2019.01)
*G06V 20/40*   (2022.01)
*G06V 20/62*   (2022.01)
*G06V 30/10*   (2022.01)
*G10L 15/08*   (2006.01)
*G10L 15/22*   (2006.01)
*G10L 25/57*   (2013.01)
*G11B 27/10*   (2006.01)

(52) U.S. Cl.
CPC ............ *G06F 16/435* (2019.01); *G06F 16/45* (2019.01); *G06F 16/489* (2019.01); *G06V 20/46* (2022.01); *G06V 20/635* (2022.01); *G06V 30/10* (2022.01); *G10L 15/08* (2013.01); *G10L 15/22* (2013.01); *G10L 25/57* (2013.01); *G11B 27/10* (2013.01); *G10L 2015/088* (2013.01)

(58) Field of Classification Search
CPC ...... G06V 30/10; G06V 20/46; G06V 20/635; G10L 15/08; G10L 15/22; G10L 25/57; G10L 2015/088; G11B 27/10
See application file for complete search history.

(56) References Cited

U.S. PATENT DOCUMENTS

| | | |
|---|---|---|
| 11,120,705 B2 | 9/2021 | Nguyen |
| 2020/0081445 A1 | 3/2020 | Stetson et al. |
| 2021/0150224 A1* | 5/2021 | Miao ................ G06V 10/70 |
| 2021/0216717 A1* | 7/2021 | Wang ................ G06F 16/3344 |
| 2022/0198211 A1* | 6/2022 | Ferreira Moreno ................ G06F 16/9027 |
| 2023/0177835 A1* | 6/2023 | Griffin ................ G06V 10/774 382/159 |

OTHER PUBLICATIONS

Lijo M. Jose et al., A semantic graph based approach on interest extraction from user generated texts in social media, Mar. 1, 2016, IEEE Xplore, pp. 1-4 (Year: 2016).*

Luo, et al, "CLIP4Clip: An Empirical Study of CLIP for End to End Video Clip Retrieval", arXiv preprint, 14 pages.

Mahon, et al, "Knowledge Graph Extraction from Videos", arXiv preprint, 11 pages.

* cited by examiner

CREATING A KNOWLEDGE GRAPH FOR A VIDEO

BACKGROUND

The present invention generally relates to video processing, and more specifically, to computer systems, computer-implemented methods, and computer program products for creating a knowledge graph for a video.

In general, the popularity and availability of online videos have drastically increased over the past several years. Online videos are often used to share knowledge, such as online classes, tutorials, and the like. When watching instructional videos, people may take notes for review later. However, it is often difficult to cross-reference a portion of the video with the notes taken by the viewer.

SUMMARY

Embodiments of the present invention are directed to a computer-implemented method of creating a knowledge graph for a video. According to an aspect, a computer-implemented method includes obtaining the video, processing the video to extract audio information and video information and storing the extracted audio information and video information with a timestamp corresponding its occurrence in the video. The method also includes creating a plurality of groups of the extracted audio information and video information based at least in part on the timestamps and extracting two or more keywords from each of the plurality of groups. The method further includes identifying a relationship between the two or more keywords based on the extracted audio information and video information and creating a graph having a plurality of nodes and a plurality of links that connect a pair of nodes of the plurality of nodes, wherein each of the plurality of nodes corresponds to an extracted keyword and each of the plurality of links corresponds to the identified relationship between the pair of nodes.

According to another non-limiting embodiment of the invention, a computer-implemented method for creating a personal knowledge graph is provided. According to an aspect, a computer-implemented method includes obtaining a knowledge graph of a video watched by a user and combining the knowledge of the video with the personal knowledge graph of the user, wherein the personal knowledge graph of the user includes a combination of the knowledge graphs of previously videos that the user has previously watched. Combining the knowledge of the video with the personal knowledge graph of the user includes combining a data for each common node in the personal knowledge graph and the knowledge graph and, upon a determination that the personal knowledge graph of the user does not include any common nodes with the knowledge graph, adding the knowledge graph to the personal knowledge graph in a disconnected manner.

According to another non-limiting embodiment of the invention, a computer program product for creating a personal knowledge graph is provided. The computer program product includes a computer-readable storage medium having program instructions embodied therewith, the program instructions executable by a processor to cause the processor to perform operations. The operations include obtaining a knowledge graph of a video watched by a user and combining the knowledge of the video with the personal knowledge graph of the user, wherein the personal knowledge graph of the user includes a combination of the knowledge graphs of previously videos that the user has previously watched. Combining the knowledge of the video with the personal knowledge graph of the user includes combining a data for each common node in the personal knowledge graph and the knowledge graph and, upon a determination that the personal knowledge graph of the user does not include any common nodes with the knowledge graph, adding the knowledge graph to the personal knowledge graph in a disconnected manner.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
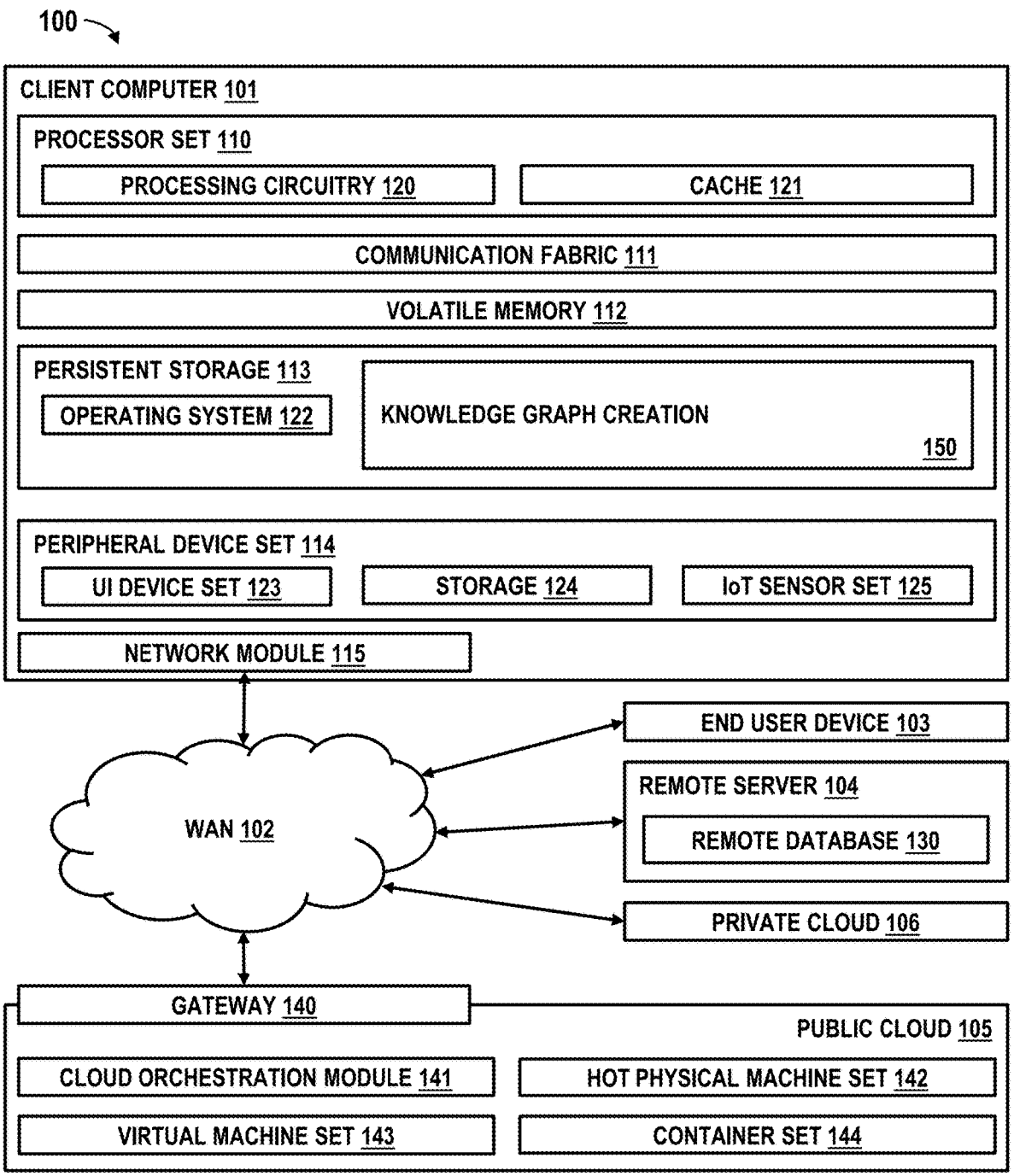
FIG. 1 depicts a block diagram of an example computer system for use in conjunction with one or more embodiments of the present invention.

As discussed above, it is difficult for a person taking notes from an online video to cross-reference their notes with the video. Disclosed herein are methods, systems, and computer program products for the creation of a knowledge graph for a video. The knowledge graph includes nodes that each represent a concept or topic covered in the video and the edges that connect pairs of nodes. The edges each represent a relationship between the pairs of nodes. In exemplary embodiments, each node and edge is displayed with an indication of the topic/relationship and upon a user clicking on a node, the portions of the video that include that topic will be displayed.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as knowledge graph creation 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up the busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
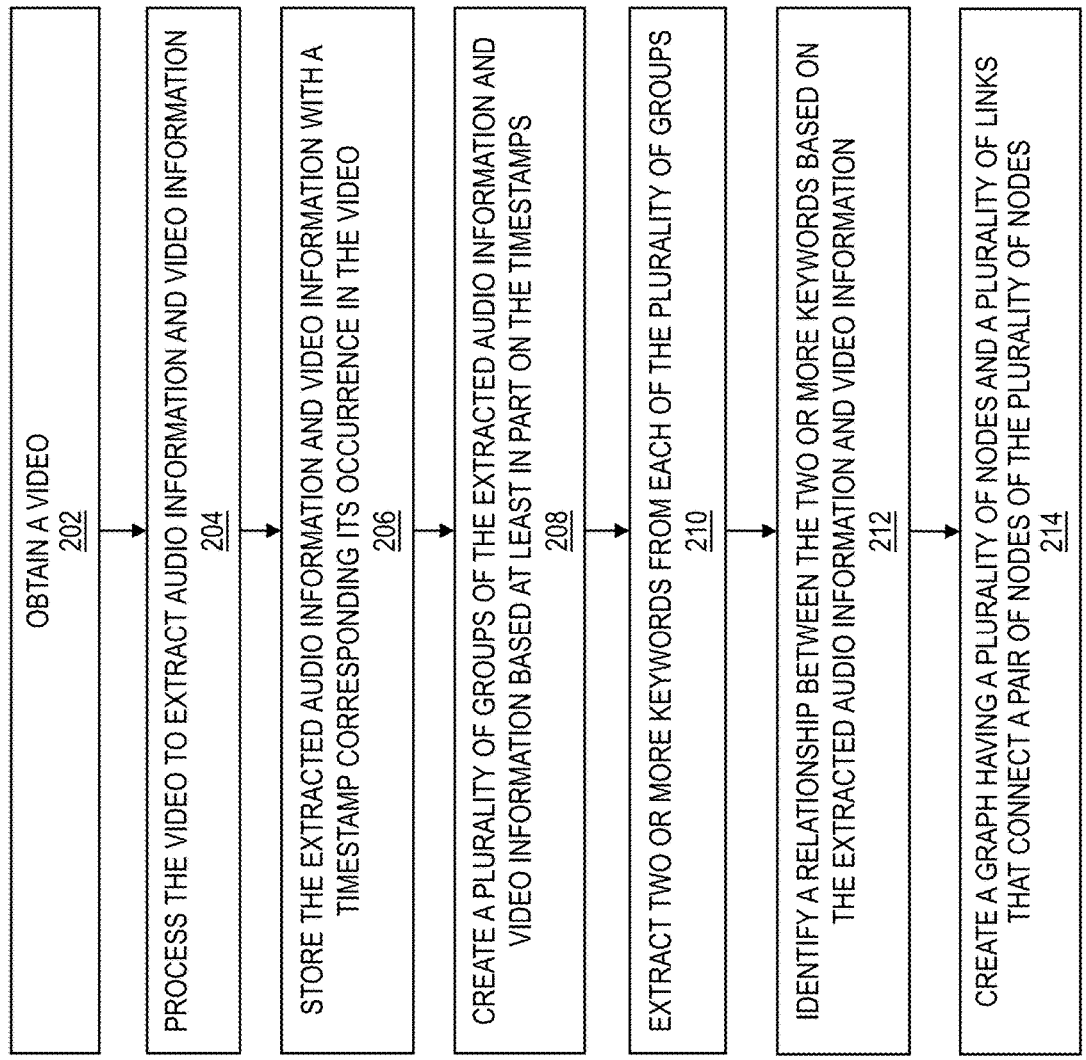
FIG. 2 is a flowchart of a method for creating a knowledge graph for a video in accordance with one or more embodiments of the present invention.

Referring now to FIG. 2, a flowchart of a method 200 for creating a knowledge graph for a video in accordance with one or more embodiments of the present invention is shown. The method 200 beings at block 202 by obtaining a video. Next, as shown at block 204, the method 200 includes processing the video to extract audio information and video information. In exemplary embodiments, processing the video to extract audio information and video information includes one or more of extracting subtitle text from the video, performing optical character recognition of text displayed in the video, and performing speech-to-text conversion of an audio track of the video.

After the audio information and video information has been extracted, the method 200 includes storing the extracted audio information and video information with a timestamp corresponding to its occurrence in the video, as shown at block 206. Next, as shown at block 208, the method 200 includes creating a plurality of groups of the extracted audio information and video information based at least in part on the timestamps. In exemplary embodiments, each of the plurality of groups corresponds to a segment of a video. The length of each segment may be determined based on a duration of a portion of the video that relates to a specific topic. In exemplary embodiments, the length of the segments of the video are non-uniform.

The method 200 also includes extracting two or more keywords from each of the plurality of groups, as shown at block 210. In exemplary embodiments, extracting two or more keywords from each of the plurality of groups includes assigning an occurrence score to each of the plurality of words in extracted audio information and video information. Once an occurrence score has been assigned to each keyword, various methods may be used to select the keywords that will be extracted. In one embodiment, all of the keywords with occurrence scores larger than a threshold value are selected as keywords. In another embodiment, a fixed number of keywords having the highest occurrence scores are selected as keywords.

In exemplary embodiments, the occurrence score is based at least in part on the frequency of that the extracted words appear in the extracted audio information and video information. In addition, to the frequency of that the extracted words appear in the extracted audio information and video information, an importance level can be ascribed to the extracted words and used to determine the occurrence score. For example, a Mel Frequency Cepstral Coefficients (MFCC) algorithm can be used to analyze the tone of speaking each word in audio to weight in the score. In addition, a size and type of font of displayed terms can be used to determine the importance level of an extracted word.

Next, as shown at block 212, the method 200 includes identifying a relationship between two or more keywords based on the extracted audio information and video information. The method 200 also includes creating a graph having a plurality of nodes and a plurality of links that connect a pair of nodes of the plurality of nodes, as shown at block 214. In exemplary embodiments, each of the plurality of nodes corresponds to an extracted keyword and each of the plurality of links corresponds to the identified relationship between the pair of nodes. In one embodiment, the size of the node in the graph corresponds to a combined occurrence score for the keyword across the plurality of groups. The method 200 may also include displaying the graph on a user-interface where each node includes a visual indication of the keyword associated with the node. In exemplary embodiments, responsive to a user selecting the node, the method 200 includes playing one or more portions of the video that correspond to the keyword.

Figure 3:
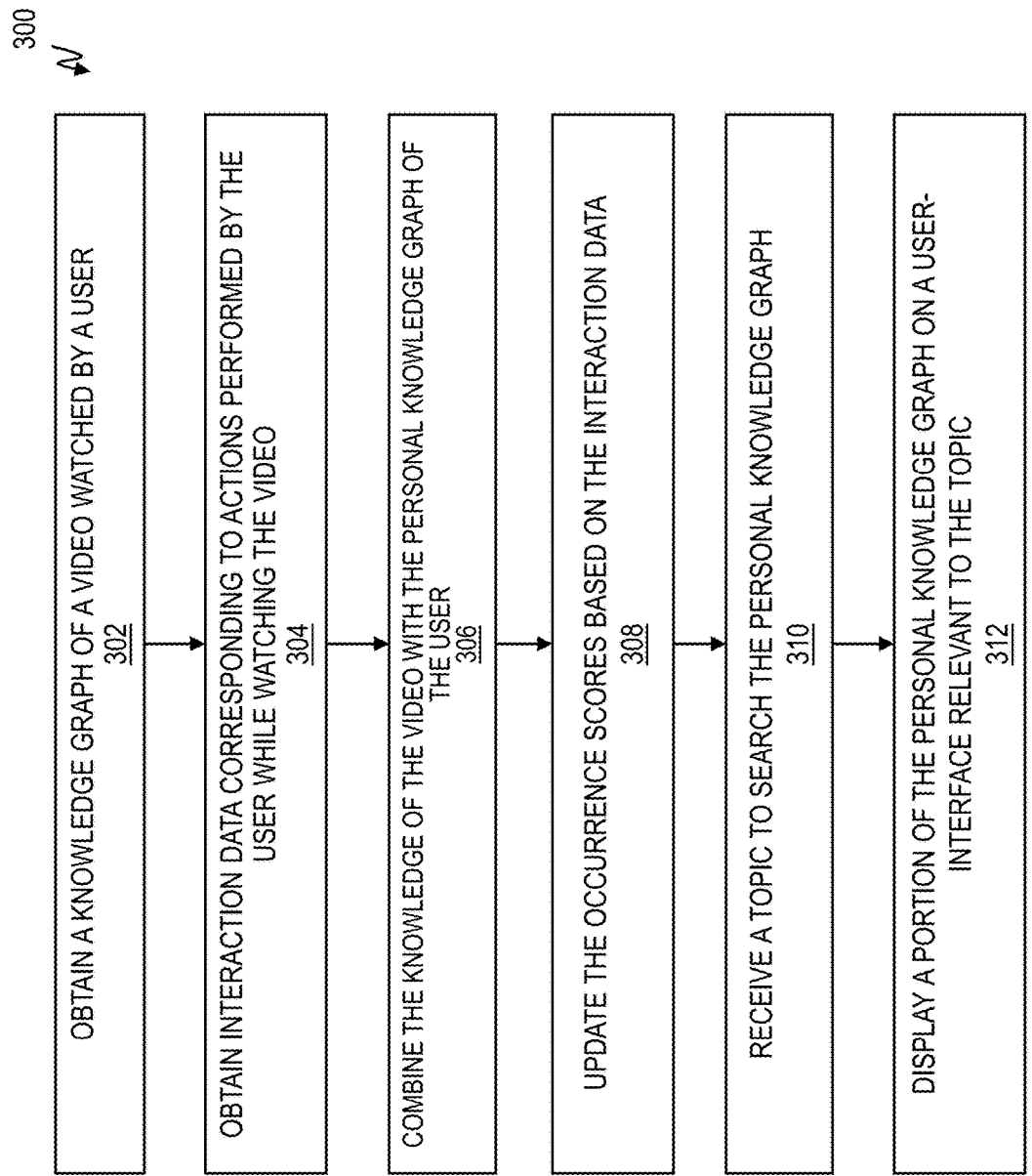
FIG. 3 is a flowchart of a method for creating a personal knowledge graph in accordance with one or more embodiments of the present invention.

Referring now to FIG. 3 a flowchart of a method 300 for creating a personal knowledge graph in accordance with one or more embodiments of the present invention is shown. The method 300 includes obtaining a knowledge graph of a video watched by a user, as shown at block 302. In exemplary embodiments, the knowledge graph for a video is obtained using the method 200 shown in FIG. 2. Next, as shown at block 304, the method 300 includes obtaining interaction data corresponding to actions performed by the user while watching the video. In exemplary embodiments, the interaction data is used to identify parts of the video that the user has a particular interest in. In one embodiment, the interaction data can include the user specifically indicating that a portion of the video is of interest, by starring or liking a particular portion of the video. In an exemplary embodiment, the interaction data includes other actions performed by the user while watching the video include the user pausing the video, a user clicking on a particular portion of the video, the user focusing on a particular portion of the video, and the user replaying a segment of the video. The method 300 also includes combining the knowledge of the video with the personal knowledge graph of the user, as shown at block 306.

Next, as shown at block 308 the method 300 includes updating the occurrence scores for the nodes of the knowledge graph of the video based on the interaction data. In exemplary embodiments, the personal knowledge graph of the user includes a combination of the knowledge graphs of previous videos that the user has previously watched. In exemplary embodiments, combining the knowledge of the video with the personal knowledge graph of the user includes combining data for each common node in the personal knowledge graph and the knowledge graph. In one embodiment, upon a determination that the personal knowledge graph of the user does not include any common nodes with the knowledge graph, adding the knowledge graph to the personal knowledge graph in a disconnected manner.

The method 300 also includes receiving a topic to search the personal knowledge graph, as shown at block 310. The method 300 concludes at block 312 by displaying a portion of the personal knowledge graph on a user interface relevant to the topic. In exemplary embodiments, each of the plurality of nodes of the personal knowledge graph corresponds to an extracted keyword and each of the plurality of links corresponds to the identified relationship between the pair of nodes. In one embodiment, the size of the node in the personal knowledge graph corresponds to a combined occurrence score for the keyword across the plurality of groups. The personal knowledge graph includes a visual indication of the keyword associated with the node. In exemplary embodiments, responsive to a user selecting the node of the personal knowledge graph, links to portions of multiple different videos that correspond to the keyword are displayed for user selection.

Figure 4:
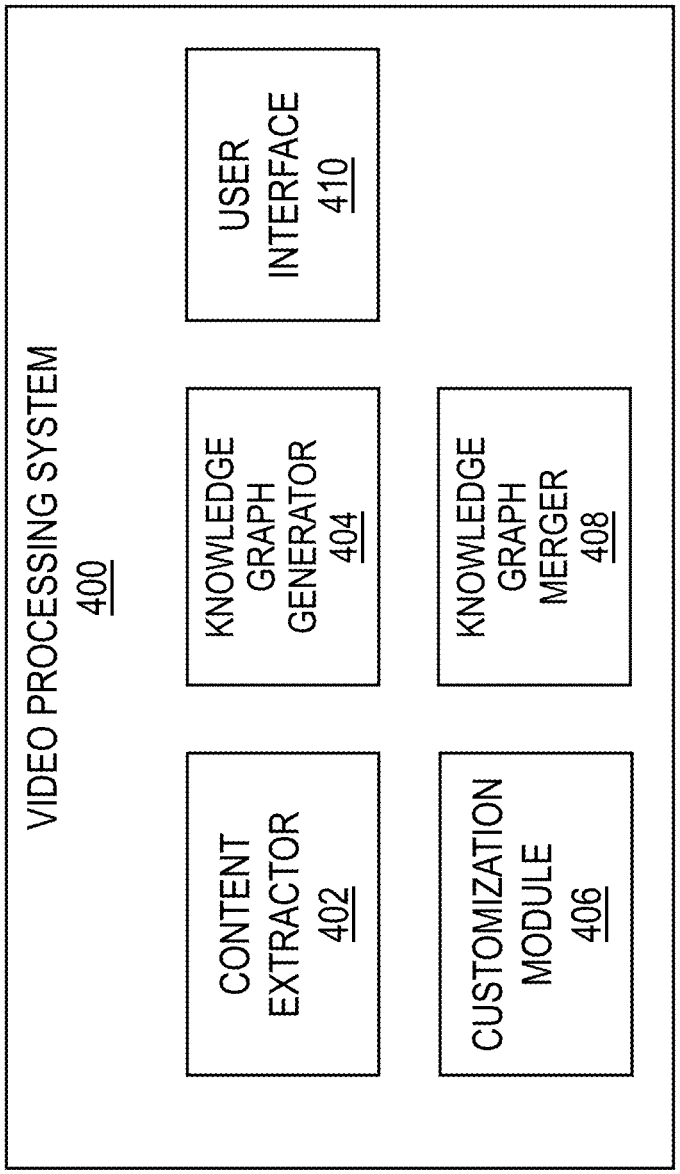
FIG. 4 is a block diagram of a video processing system in accordance with one or more embodiments of the present invention.

Referring now to FIG. 4, a block diagram of a video processing system 400 in accordance with one or more embodiments of the present invention is shown. In exemplary embodiments, the video processing system 400 may be embodied in a computer 101, such as the one shown in FIG. 1. As illustrated, the video processing system 400 includes a content extractor 402, a knowledge graph generator 404, a customization module 406, a knowledge graph merger 408, and a user interface 410.

In exemplary embodiments, the content extractor 402 is configured to process a video and extract audio and video information from the video. In one embodiment, the audio information includes subtitles included in the video and using speech-to-text technology to an audio track for the video. In exemplary embodiments, the audio information is stored along with a timestamp that includes when in the video the audio information occurred. The content extractor 402 is also configured to perform optical character recognition on any text displayed during the video and to store that information along with a timestamp that includes when in the video the audio information occurred. The content extractor 402 is further configured to analyze content and items displayed during the video and to create tags regarding items displayed or shown during the video, these tags are stored as video information along with a timestamp that includes when in the video information occurred.

In exemplary embodiments, the knowledge graph generator 404 is configured to process the stored audio and video information and to build a knowledge graph based on the audio and video information extract keywords. In one embodiment, the knowledge graph generator 404 is configured to create a plurality of groups from the extracted audio information and video information based at least in part on the timestamps, where each group corresponds to a segment, or portion of, the video. The knowledge graph generator 404 is also configured to extract keywords from the stored audio and video information for each segment, where the keywords represent the topics discussed during the segment of the video. In exemplary embodiments, each extracted keyword is assigned an occurrence score which indicates how prominent the topic is in the video segment. That is, the higher the occurrence score the more the topic was discussed during the segment. In exemplary embodiments, the knowledge graph generator 404 sums up the occurrence scores generated across the audio and video information to create a total occurrence score for each keyword and segment. The knowledge graph generator 404 is configured to create a graph having a node that corresponds to each keyword, wherein the size of the node is positively correlated with the total occurrence score. Finally, the knowledge graph generator 404 is configured to identify a relationship between the nodes based on the audio and video information and to create links between pairs of nodes that represent the identified relationships.

In exemplary embodiments, the customization module 406 is configured to obtain user interaction data and modify a personal knowledge graph based on the user interaction data. In exemplary embodiments, the user interaction data corresponds to user actions performed while watching the video and can include the user pausing the video, a user clicking on a particular portion of the video, the user focusing on the particular portion of the video, and the user replaying a segment of the video. In exemplary embodiments, the customization module 406 is configured to update an occurrence score for a topic of a personal knowledge graph for a video based on the user's interest in the topic. For example, if a user pauses the video during the presentation of a slide the occurrence scores for the keywords associated with that slide are increased.

In exemplary embodiments, the knowledge graph merger 408 is configured to merge two or more knowledge graphs for different videos to create a personal knowledge graph for a user. In exemplary embodiments, a user has a personal knowledge graph that is added to each time a user watches a new video. The personal knowledge graph may include two or more disconnected knowledge graphs, i.e., knowledge graphs that do not share any common nodes. In one embodiment, the knowledge graph merger 408 combines the common nodes and relationships from the input knowledge graphs and also updates the sizes of the nodes based on the combined occurrence scores. In addition, the thickness of the lines that represent the relationships between the nodes can be increased to reflect more commonly occurring relationships.

In exemplary embodiments, the user interface 410 is configured to display one or more of a knowledge graph for a video and a personal knowledge graph for a user. The user interface 410 is further configured to permit a user to navigate the videos based on interactions with the displayed knowledge graph.

Figure 5:
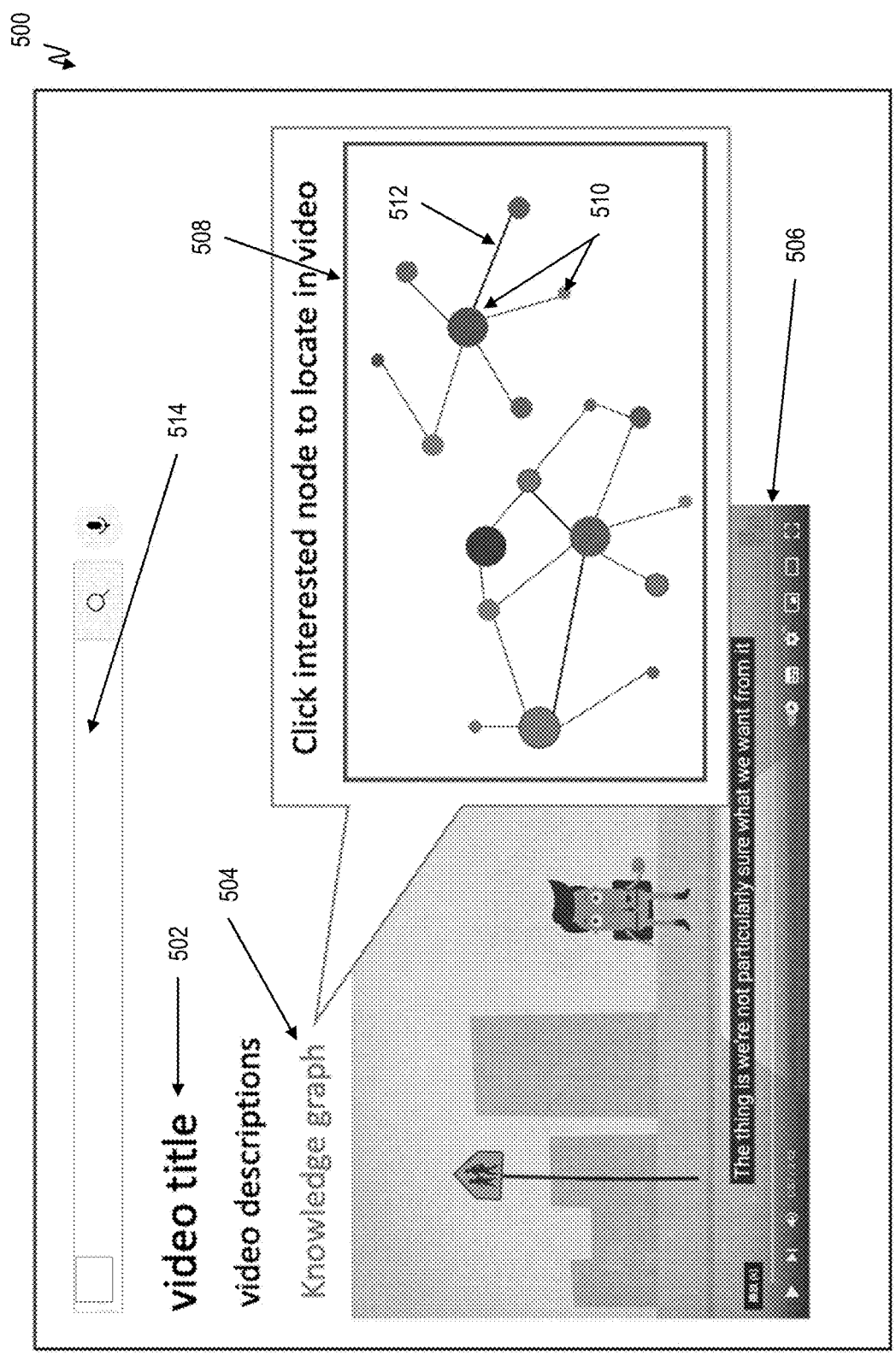
FIG. 5 is a user interface for displaying a video and an associated knowledge graph in accordance with one or more embodiments of the present invention.

Referring now to FIG. 5, a user interface 500 for displaying a video and an associated knowledge graph in accordance with one or more embodiments of the present invention is shown. As illustrated, the user interface 500 is configured to display a video 506 and a knowledge graph 508 associated with the video 506. In one embodiment, the user interface 500 also displays a title of the video 502, a link 504 to the knowledge graph 508, and a search bar 514 that is configured to search for the video 506. In exemplary embodiments, the knowledge graph 508 includes a plurality of nodes 510 that are connected by edges 512. Each node 510 represents a topic in the video 506 and each edge 512 represents a relationship between the connected nodes 510. In one embodiment, the size of each node 510 and optionally the thickness of each edge 512 indicates the prominence of the topic/relationship in the video, i.e., the more a topic is discussed the larger the node 510 will be. In an exemplary embodiment, the user interface 500 is configured to display pop-up text next to each node 510 and edge 512 when the user places a cursor over the node 510 or edge 512. In exemplary embodiments, the user interface 500 is configured to display one or more segments of the video 506 that correspond to a node 510 based on the user clicking on the node 510.

Figure 6:
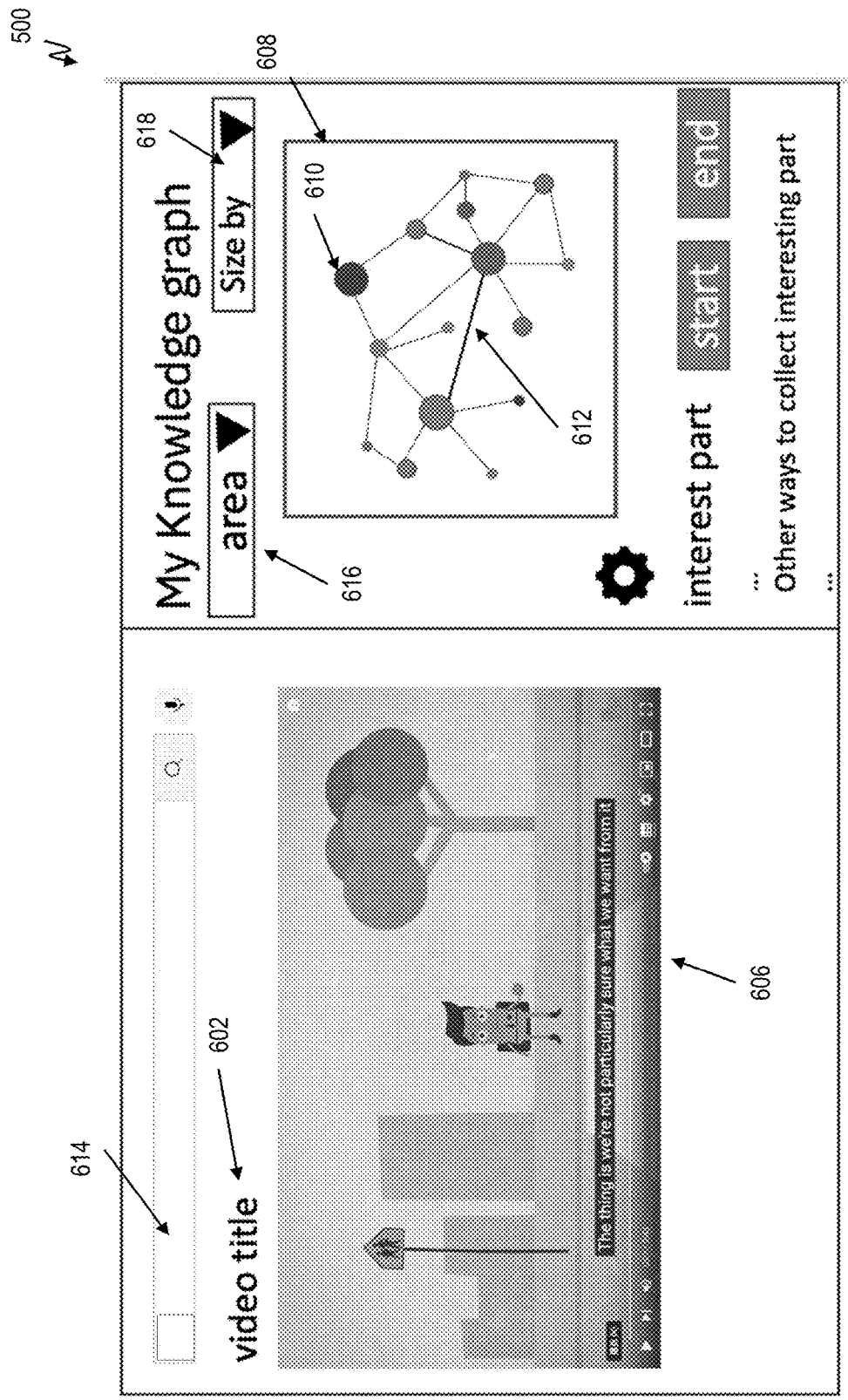
FIG. 6 is a user interface for searching a personal knowledge graph that includes displaying a relevant portion of the personal knowledge graph in accordance with one or more embodiments of the present invention.

Referring now to FIG. 6 a user interface 600 for searching a personal knowledge graph 608 that includes displaying a relevant portion of the personal knowledge graph 608 in accordance with one or more embodiments of the present invention is shown. As illustrated, the user interface 600 is configured to display a video 606 and a personal knowledge graph 608. The personal knowledge graph 608 include nodes 610 and edges 612. Each node 610 represents a topic in a collection of videos that have been watched by a user and each edge 612 represents a relationship between the connected nodes 610. In one embodiment, the size of each node 610 and optionally the thickness of each edge 612 indicates the prominence of the topic/relationship in the collection of videos. In exemplary embodiments, the user interface 600 is configured to display one or more segments of the collection of videos 606 that correspond to a node 610 based on the user clicking on the node 610.

In exemplary embodiments, the user interface 600 is configured to display a title 602 of the video 606 being displayed. The user interface 600 also includes a topic search bar 616 that is configured to receive a topic from a user to search the personal knowledge graph 608. The user interface 600 also includes a size selection tool 618 that is configured to receive a metric from the user to select the size of a portion of the personal knowledge graph 608 that is displayed in response to a topic search.

Figure 7:
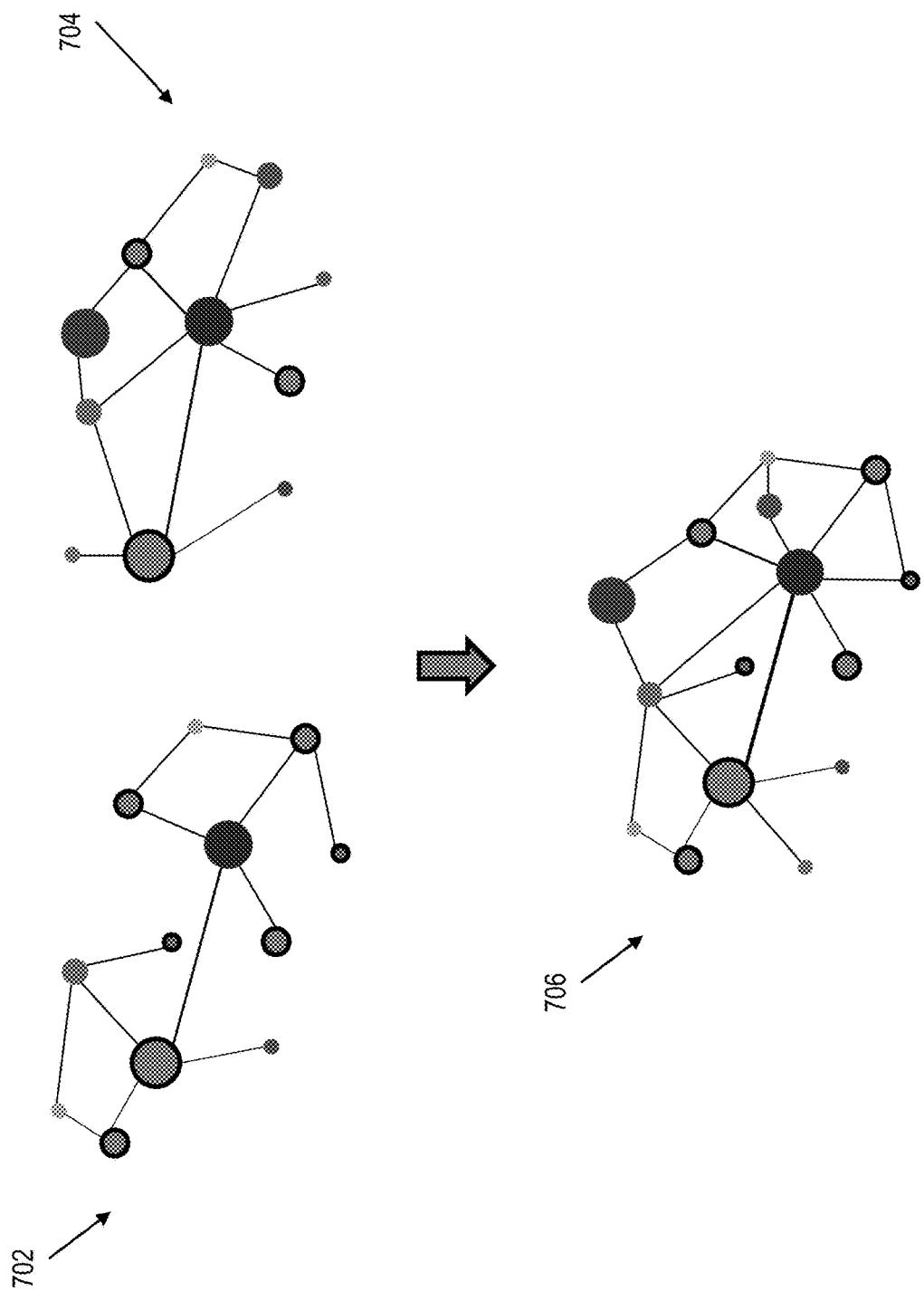
FIG. 7 is an illustration of a method for merging two knowledge graphs in accordance with one or more embodiments of the present invention.

Referring now to FIG. 7, an illustration of a method for merging two knowledge graphs in accordance with one or more embodiments of the present invention. As illustrated, a first knowledge graph 702 and a second knowledge graph 704 are combined into a merged knowledge graph 706. In exemplary embodiments, merging the first knowledge graph 702 and the second knowledge graph 704 includes combining any common nodes and summing up an occurrence score of the common nodes to get a total occurrence score for the combined nodes. In addition, nodes that are only present in one of the two knowledge graphs 702, 704 are added to the merged knowledge graph 706 and keep their previously assigned occurrence score. In the event there is no overlap between the nodes of the first knowledge graph 702 and the second knowledge graph 704, the combined knowledge graph 706 will include two disconnected graphs that each correspond to one of the first knowledge graph 702 and the second knowledge graph 704.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one"

and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for creating a knowledge graph of a video, the method comprising:
    obtaining the video;
    processing the video to extract audio information and video information;
    storing the extracted audio information and video information with a timestamp corresponding its occurrence in the video;
    creating a plurality of groups of the extracted audio information and video information based at least in part on the timestamps;
    extracting two or more keywords from each of the plurality of groups;
    identifying a relationship between the two or more keywords based on the extracted audio information and video information; and
    creating a graph having a plurality of nodes and a plurality of links that connect a pair of nodes of the plurality of nodes, wherein each of the plurality of nodes corresponds to an extracted keyword and each of the plurality of links corresponds to the identified relationship between the pair of nodes.

2. The computer-implemented method of claim 1, wherein processing the video to extract audio information and video information includes one or more of extracting subtitle text from the video, performing optical character recognition of text displayed in the video, and performing speech to text conversion of an audio track of the video.

3. The computer-implemented method of claim 1, wherein extracting two or more keywords from each of the plurality of groups includes identifying assigning an occurrence score to each of plurality of words in extracted audio information and video information and selecting one of more of the plurality of words with occurrences scores larger than a threshold value as keywords.

4. The computer-implemented method of claim 3, wherein a size of a node in the graph corresponds to a combined occurrence score for the keyword across the plurality of groups.

5. The computer-implemented method of claim 1, displaying the graph on a user-interface, wherein each node includes a visual indication of the keyword associated with the node, and responsive to a user selecting the node, playing one or more portions of the video that correspond to the keyword.

6. A computer-implemented method for creating a personal knowledge graph, the method comprising:
    obtaining a knowledge graph of a video watched by a user; and
    combining the knowledge of the video with the personal knowledge graph of the user, wherein the personal knowledge graph of the user includes a combination of the knowledge graphs of previously videos that the user has previously watched,
    wherein combining the knowledge of the video with the personal knowledge graph of the user includes combining a data for each common node in the personal knowledge graph and the knowledge graph, and
    wherein upon a determination that the personal knowledge graph of the user does not include any common nodes with the knowledge graph, adding the knowledge graph to the personal knowledge graph in a disconnected manner.

7. A computer-implemented method of claim 6, wherein obtaining the knowledge graph of the video watched by the user comprises:
    processing the video to extract audio information and video information;
    storing the extracted audio information and video information with a timestamp corresponding its occurrence in the video;
    creating a plurality of groups of the extracted audio information and video information based at least in part on the timestamps;
    extracting two or more keywords from each of the plurality of groups;
    identifying a relationship between the two or more keywords based on the extracted audio information and video information; and
    creating a graph having a plurality of nodes and a plurality of links that connect a pair of nodes of the plurality of nodes, wherein each of the plurality of nodes corresponds to an extracted keyword and each of the plurality of links corresponds to the identified relationship between the pair of nodes.

8. The computer-implemented method of claim 7, wherein processing the video to extract audio information and video information includes one or more of extracting subtitle text from the video, performing optical character recognition of text displayed in the video, and performing speech to text conversion of an audio track of the video.

9. The computer-implemented method of claim 7, wherein extracting two or more keywords from each of the plurality of groups includes identifying assigning an occurrence score to each of plurality of words in extracted audio information and video information and selecting one of more of the plurality of words with occurrences scores larger than a threshold value as keywords.

10. A computer-implemented method of claim 9, further comprising:
    obtaining interaction data corresponding to actions performed by the user while watching the video; and
    updating the occurrence scores based on the interaction data.

11. The computer-implemented method of claim 10, wherein the actions performed by the user while watching the video include the user pausing the video, a user clicking on a particular portion of the video, the user focusing on the particular portion of the video, and the user replaying a segment of the video.

12. The computer-implemented method of claim 10, wherein a size of a node in the personal knowledge graph corresponds to a combined occurrence score for the keywords for each node.

13. The computer-implemented method of claim 7, displaying the personal knowledge graph on a user-interface, wherein each node includes a visual indication of the keyword associated with the node, and responsive to a user selecting the node, playing one or more portions of the videos that correspond to the keyword.

14. The computer-implemented method of claim 13, wherein the user interface includes a topic search input configured to receive a topic to search the personal knowledge graph and wherein a relevant portion of the personal knowledge graph is displayed based on receiving the topic.

15. A non-transitory computer program product comprising a memory with one or more computer executable instructions stored thereon, which when executed by one or more processing units cause the one or more processing units to perform a method for creating a personal knowledge graph, the method comprising:
   obtaining a knowledge graph of a video watched by a user; and
   combining the knowledge of the video with the personal knowledge graph of the user, wherein the personal knowledge graph of the user includes a combination of the knowledge graphs of previously videos that the user has previously watched,
   wherein combining the knowledge of the video with the personal knowledge graph of the user includes combining a data for each common node in the personal knowledge graph and the knowledge graph, and
   wherein upon a determination that the personal knowledge graph of the user does not include any common nodes with the knowledge graph, adding the knowledge graph to the personal knowledge graph in a disconnected manner.

16. A program product of claim 15, wherein obtaining the knowledge graph of the video watched by the user comprises:
   processing the video to extract audio information and video information;
   storing the extracted audio information and video information with a timestamp corresponding its occurrence in the video;
   creating a plurality of groups of the extracted audio information and video information based at least in part on the timestamps;
   extracting two or more keywords from each of the plurality of groups;
   identifying a relationship between the two or more keywords based on the extracted audio information and video information; and
   creating a graph having a plurality of nodes and a plurality of links that connect a pair of nodes of the plurality of nodes, wherein each of the plurality of nodes corresponds to an extracted keyword and each of the plurality of links corresponds to the identified relationship between the pair of nodes.

17. The program product of claim 16, wherein processing the video to extract audio information and video information includes one or more of extracting subtitle text from the video, performing optical character recognition of text displayed in the video, and performing speech to text conversion of an audio track of the video.

18. The program product of claim 16, wherein extracting two or more keywords from each of the plurality of groups includes identifying assigning an occurrence score to each of plurality of words in extracted audio information and video information and selecting one of more of the plurality of words with occurrences scores larger than a threshold value as keywords.

19. A program product of claim 18, wherein the method further comprises:
   obtaining interaction data corresponding to actions performed by the user while watching the video; and
   updating the occurrence scores based on the interaction data.

20. The program product of claim 19, wherein the actions performed by the user while watching the video include the user pausing the video, a user clicking on a particular portion of the video, the user focusing on the particular portion of the video, and the user replaying a segment of the video.

* * * * *